US006993627B2

(12) United States Patent
Butterworth et al.

(10) Patent No.: US 6,993,627 B2
(45) Date of Patent: Jan. 31, 2006

(54) DATA STORAGE SYSTEM AND A METHOD OF STORING DATA INCLUDING A MULTI-LEVEL CACHE

(75) Inventors: Henry Esmond Butterworth, San Jose, CA (US); Robert Bruce Nicholson, Southsea (GB)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 10/015,088

(22) Filed: Dec. 12, 2001

(65) Prior Publication Data

US 2002/0073277 A1 Jun. 13, 2002

(30) Foreign Application Priority Data

Dec. 12, 2000 (GB) .................................... 0030226

(51) Int. Cl.
*G06F 12/08* (2006.01)

(52) U.S. Cl. ....................... 711/122; 711/113; 711/117; 711/118; 711/162; 711/165; 711/202

(58) Field of Classification Search ................ 711/122, 711/202, 112, 154

See application file for complete search history.

(56) References Cited

U.S. PATENT DOCUMENTS

| | | | | |
|---|---|---|---|---|
| 5,410,667 A | | 4/1995 | Belsan et al. | 395/425 |
| 5,689,679 A | * | 11/1997 | Jouppi | 711/122 |
| 6,618,794 B1 | * | 9/2003 | Sicola et al. | 711/154 |
| 6,629,198 B2 | * | 9/2003 | Howard et al. | 711/112 |

OTHER PUBLICATIONS

J. Menon, "A Performance Comparison of RAID-5 and Log-Structured Arrays", Proceedings of the Fourth IEEE International Symposium on High Performance Distributed Computing, 1995, pp. 167-178.

* cited by examiner

*Primary Examiner*—Gary L. Laxton
*Assistant Examiner*—Craig Evan Walter
(74) *Attorney, Agent, or Firm*—Esther E. Klein; Randall J. Bluestone

(57) ABSTRACT

A data storage system (100) and a method of storing data are described including a cache (118) with a variable number of levels (210, 220, 230, 240). Each level in the cache (118) has a cache controller (212, 222, 232, 242) and a cache memory (214, 224, 234, 244) for storing data. An address mapping is recorded and applied between each of the levels of the cache (118). The address mapping corresponds to a point in time virtual copy operation such as a snapshot copy operation applied to the cache (118) and enables point in time virtual copy operations to be carried out in electronic time. A new level is created in the cache (118) when a point in time virtual copy operation is received by the cache and a corresponding address mapping is applied to the previous level in the cache (118).

36 Claims, 5 Drawing Sheets

DATA STORAGE SYSTEM AND A METHOD OF STORING DATA INCLUDING A MULTI-LEVEL CACHE

FIELD OF THE INVENTION

This invention relates to a data storage system and a method of storing data including a multi-level cache. In particular, the invention relates to write-back caches (sometimes referred to as "fast write" caches) capable of accommodating point in time copy operations in data storage systems.

BACKGROUND OF THE INVENTION

It is important in a great number of situations to be able to obtain a point in time copy of a data system. The term "point in time" is used to mean that a copy of a data set is taken that is consistent across the data set at a given moment in time. Data cannot be updated whilst it is being copied as this would result in inconsistencies in the copied data.

Point in time copies are useful in a variety of situations. Applications include but are not limited to: obtaining a consistent backup of a data set, taking an image of a long running batch processing job so that it may be restarted after a failure, applications testing etc.

In order to create a point in time copy in a data processing system, the flow of writes to the data set(s) being copied must be interrupted so that no updates occur for the duration of the copy operation. Interrupting the flow of writes is likely to mean that the data processing system is unavailable for processing transactions from client applications during the point in time copy operation. A very large proportion of systems now run on a 24 hour basis and an interruption of this form is unacceptable.

The time taken for a copy to be created or the elapsed time that the system is unavailable needs to as small as possible. An ideal system would perform the point in time copy in a time short enough to be tolerated by the client application or user. One way to measure this would be to look at the transaction timeout. The transaction timeout will vary depending upon the system; some common examples are the timeout within a web browser or the time a typical user will wait before attempting to cancel or backout a transaction. Typically this is over the order of seconds or tens of seconds.

A number of technologies are known for implementing point in time copies. U.S. Pat. No. 5,410,667 describes one well known technique used in storage subsystems implementing a 'Log Structured Array' (LSA) such as IBM Corporation's RAMAC Virtual Array (RVA) referred to as "Snapshot Copy". EMC Corporation's "Timefinder" product uses a simpler technique which is applicable to non LSA subsystems. Other implementations include "Flash Copy" on the IBM Enterprise Storage Server (ESS). There are in fact quite a number of different methods for implementing point in time copy, all of which share the necessity to interrupt the flow of updates to the data sets whilst the copy is established.

A discussion of LSAs is given in "A Performance Comparison of RAID 5 and Log Structured Arrays", Proceedings of the Fourth IEEE International Symposium on High Performance Distributed Computing, 1995, pages 167–178, in addition to U.S. Pat. No. 5,410,667 which discusses LSAs in the context of snapshot copy.

Snapshot copy in a Log Structured Array (LSA) is now described as one example of point in time copy technology. Snapshot copy allows extents of the virtual storage space to be copied just by manipulating meta-data without the relatively high overhead of actually moving the copied data.

An LSA has an array of physical direct access storage devices (DASDs) to which access is controlled by an LSA controller having an LSA directory which has an entry for each logical track providing its current location in the DASD array. The data in the LSA directory is meta-data, data which describes other data. Snapshot copy describes a system by which the LSA directory is manipulated so as to map multiple areas of the logical address space onto the same set of physical data on the DASDs. This operation is performed as an "atomic event" in the subsystem by means of locking. Either copy of the data can subsequently be read or be written to without affecting the other copy of the data, a facility known as copy on write.

Snapshot copy employs an architecture with virtual volumes represented as a set of pointers in tables. A snapshot operation is the creation of a new view of the volume or data set being "snapped" by coping the pointers. None of the actual data is accessed, read, copied or moved.

Snapshot copy has several benefits to the customer: (1) It allows the capture of a consistent image of a data set at a point in time. This is useful in many ways including backup and application testing and restart of failing batch runs. (2) It allows multiple copies of the same data to be made and individually modified without allocating storage for the set of data which is common between the copies.

Throughput of the copy operation can be very high since little data needs to be transferred. Copied areas which are not subsequently written can share the same physical storage thus achieving a kind of compression.

Flash copy is now described as a non LSA example of point in time copy technology.

In a system implementing flash copy a source local volume may be flash copied to a destination volume. After the flash copy operation is executed, the destination volume behaves as if it had been instantaneously copied from the source volume at the instant that the flash copy was executed. The flash copy is implemented in a mapping layer which exists logically between the volumes and the underlying physical volumes. The mapping layer uses a data structure to record which parts of the source volume have actually been copied to the destination and uses this information to direct reads and writes accordingly. Reads to the destination are inspected to determine whether any part of the read data has yet to be copied. In the event that some part has yet to be copied, that part of the read data is delivered from the source volume. Writes to the source are inspected to determine whether they touch an uncopied area of source. In the event that they do, the source volume is copied to the destination volume prior to writing the source, preserving the view that the destination was really copied at the point in time that the flash copy was executed. Writes to an uncopied area of the destination result in the data structure being updated to show that no copy is now necessary for that region of the volume.

Another method is similar to the above method, but instead of copying data to the same place on a destination volume as it is on the source volume, it writes to a journal that describes the data. Less storage space is needed in this method on the destination storage and therefore it is cheaper.

The above methods are all methods of taking point in time virtual copies of a data set.

Customers of storage arrays are often concerned with reliability, access times, and cost per megabyte of data stored. LSA and RAID storage subsystems provide ways of addressing the reliability issue and access requirements. Access time is improved by caching data. A cache is a fast random access memory often included as part of a storage subsystem to further increase the I/O speed. In the case of an LSA, a write-back cache is usually provided in the LSA controller.

A cache stores information that either has recently been requested from the DASDs or that needs to be written to the DASDs. The effectiveness of a cache is based on the principle that once a memory location has been accessed, it is likely to be accessed again soon. This means that after the initial access, subsequent accesses to the same memory location need go only to the cache. Much computer processing is repetitive so a high hit rate in the cache can be anticipated.

For improved performance, storage subsystems make use of a write-back cache, sometimes known as a fast write cache, for write I/O transactions where data is written in electronic time and completion given to the initiator of the I/O transaction before the data is actually destaged to the underlying storage. Write caching has a strong affinity with point in time virtual copy techniques. Delaying writes to the source volume whilst the underlying data is read from the source and written to the destination adds significant latency to write operations and therefore a write-back cache is useful to isolate the host application from this added latency.

The write-back cache is best placed logically between the I/O initiator and the component implementing point in time copy. For example, in the case of an LSA, the write-back cache sits between the host processor and the LSA directory. If the cache is placed logically between the component implementing point in time copy and the underlying physical storage then it is unable to isolate the host application from the additional latency introduced from writes to the uncopied area as explained above.

The problem is that if the write-back cache is in-between the I/O initiator and the component which manages the point in time copy meta-data then the point in time copy meta-data cannot be manipulated until the data in the write-back cache for both the source and destination regions of the point in time copy has been flushed and flushed or invalidated respectively.

This is a problem because with a conventional write-back cache the source region of the point in time must be flushed and the destination region flushed or invalidated before the point in time copy can be processed and completion given to the host. While the point in time copy operation is in process, no new writes can be accepted. This flushing operation takes mechanical time for each write with current disk technology. If there is a large amount of undestaged data in the cache, the point in time copy cannot complete until the data is destaged or invalidated. The time taken depends upon the quantity of undestaged data in the cache, which could be large, and the rate at which it can be destaged to the underlying disks, which could be low. With a large amount of undestaged data and a low destage rate the time taken to flush the cache could be minutes to tens of minutes.

If flushing is needed as part of the point in time copy, the point in time copy may take a long time. When a point in time copy is taken of an operational system, such as a database, the system is normally unavailable while the point in time copy is done, therefore a delay due to flushing is undesirable. The difference between electronic time and disk writing time for destaging a number of writes to disk is very significant.

DISCLOSURE OF THE INVENTION

According to a first aspect of the present invention there is provided a data storage system including a cache comprising a variable number of levels, each level having a cache controller and a cache memory wherein means are provided for address mapping to be recorded and applied between each level of the cache.

The cache controller can be integral with the cache as a combination of software and/or hardware which provides the logical equivalent of a separate cache controller.

Preferably, the means for address mapping are provided for a level between that level and the level above in the cache closer to the I/O initiator or host. The cache preferably includes means for creating a new level in the cache above an existing level and means are also provided for tying an address mapping to the existing level.

The address mapping between the levels of the cache may correspond to a point in time virtual copy operation which has been committed to the cache in electronic time. A new level may be created in the cache when a point in time virtual copy operation is committed to the cache. A plurality of point in time virtual copy operations may be tied to a single level provided the point in time virtual copy operations do not conflict with any intervening writes to the cache.

Preferably, the cache includes means for deleting a level of the cache including means for destaging data from the level to underlying storage devices. Lower levels of the cache may be destaged before upper levels and after a level is destaged, the address mapping recorded for a destaged level is applied to underlying storage devices.

The data storage system may also include a processor and memory, and underlying data storage devices in the form of an array of storage devices having a plurality of data blocks organized on the storage devices in segments distributed across the storage devices, wherein when a data block in a segment stored on the storage devices in a first location is updated, the updated data block is assigned to a different segment, written to a new storage location and designated as a current data block, and the data block in the first location is designated as an old data block, and having a main directory, stored in memory, containing the locations on the storage devices of the current data blocks. The data storage system may be in the form of a log structured array and the point in time virtual copy operation may be a snapshot copy operation.

The point in time virtual copy operation may be a flash copy operation.

According to a second aspect of the present invention there is provided a cache comprising high-speed memory, the cache having a variable number of levels, each level having a cache controller and a cache memory, wherein means are provided for address mapping to be recorded and applied between each level.

According to a third aspect of the present invention there is provided a method of data storage comprising reading and writing data to a cache having a variable number of levels, wherein the method includes recording and applying address mapping between each level of the cache.

Preferably, the address mapping is provided for a level between that level and the level above in the cache. The method preferably includes creating a new level in the cache above an existing level and tying an address mapping to the existing level.

The address mapping between the levels of the cache may correspond to a point in time virtual copy operation which has been committed to the cache in electronic time. The method may include creating a new level in the cache when a point in time virtual copy operation is committed to the cache. A plurality of point in time virtual copy operations may be tied to a single level provided the point in time virtual copy operations do not conflict with any intervening writes to the cache.

The method may include the steps of: writing data to a first level of the cache until a point in time virtual copy operation is committed to the cache; recording the mapping defined by the point in time virtual copy operation; tying the record to the first level; creating a second level of the cache above the first level; writing subsequent writes to the second level of the cache. The point in time virtual copy operation may be a snapshot copy operation. Alternatively, the point in time virtual copy operation may be a flash copy operation.

The method may include the steps of: receiving a read request in the cache; searching a first level of the cache for the read; applying the address mapping for the next level to the read request; searching the next level of the cache; continuing the search through subsequent levels of the cache; and terminating the search when the read is found.

The method may also include the step of remapping a read request by applying all the address mappings of the levels of the cache to the read request and applying the remapped read request to an underlying storage system.

Preferably, the method includes deleting a level of the cache including destaging data from the level to underlying storage devices. The method may include the steps of: destaging data from the lowest level of the cache to an underlying storage system; applying the address mapping for the lowest level to the underlying storage system; deleting the lowest level of the cache.

According to a fourth aspect of the present invention there is provided a computer program product stored on a computer readable storage medium, comprising computer readable program code means for performing the steps of reading and writing data to a cache having a variable number of levels, recording and applying an address mapping between each level of the cache.

In this way, the multi-level write-back cache is able to accept point in time virtual copy operations such as point in time copy operations in electronic time and maintain availability to extents covered by point in time copy operations and preserve the semantics of the point in time copy operations.

The present invention has the following advantages:

No need to flush or invalidate an extent of the write-back cache to perform a point in time copy operation.

- No need to copy data in the cache to perform a point in time copy operation.
- Point in time copy operations can be processed in electronic time.
- Point in time copy operations can coalesce in the cache.
- Semantics of point in time copy operations are preserved; even if there is data for both the source and destination in the cache before the point in time copy, afterwards both the source and destination will share the same physical storage.
- Source and destination regions of point in time copy can be read/written to before point in time copy meta-data update is complete.

BRIEF DESCRIPTION OF THE DRAWINGS

An embodiment of the invention will now be described, by means of example only, with reference to the accompanying drawings in which.

DESCRIPTION OF THE PREFERRED EMBODIMENTS

An embodiment is now described in the context of a log structured array storage subsystem. However, the present invention can apply equally to any other forms of storage system which have a write-back cache. As mentioned before, references to point in time copy can include all the forms of taking point in time virtual copies of a data set as described in the preamble.

Figure 1:
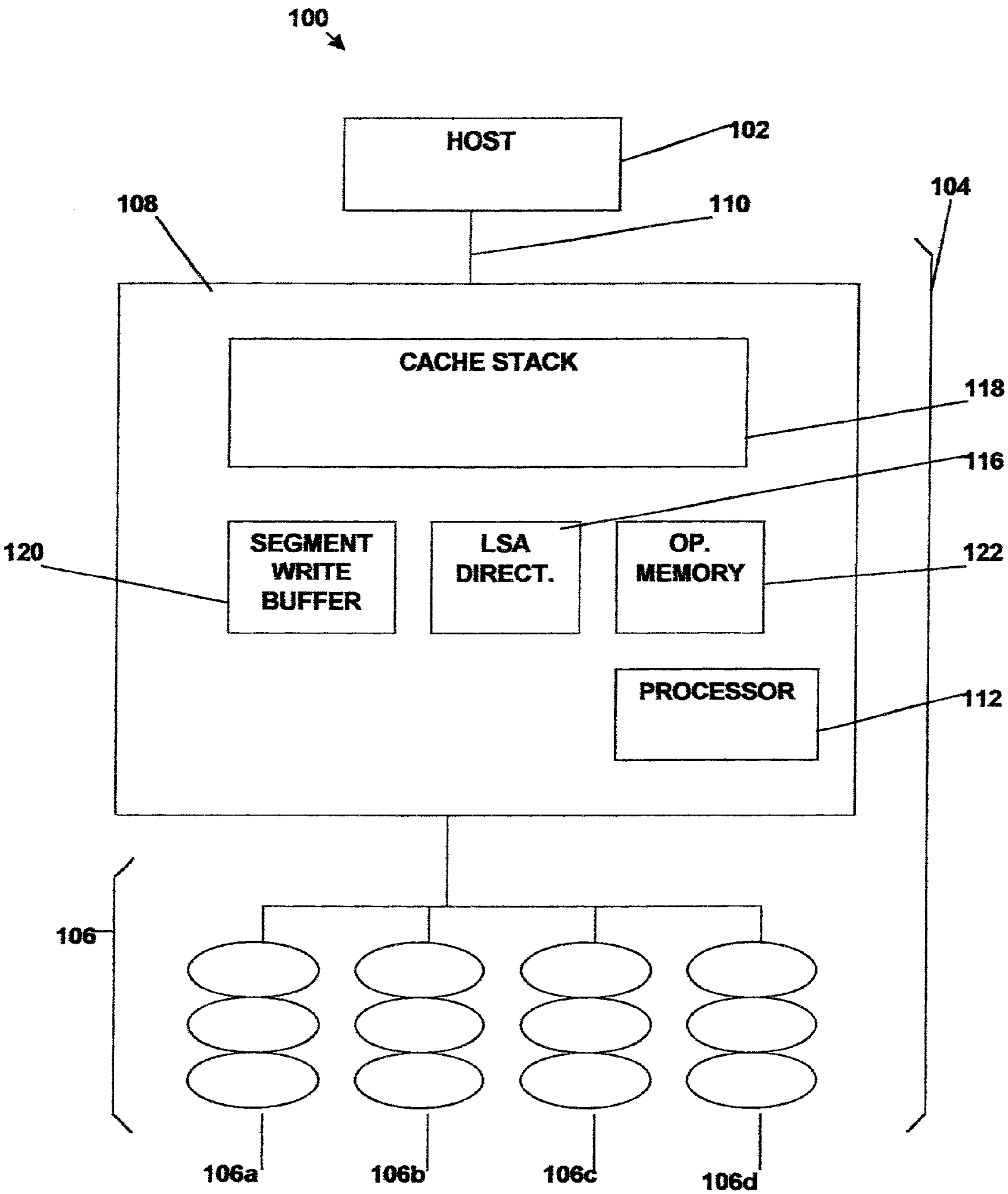
FIG. 1 is a diagrammatic representation of a log structure array storage subsystem including the method and apparatus of the present invention.

Referring to FIG. 1, a storage system 100 includes one or more processors 102 or host computers that communicate with an external information storage system 104 having N+M direct access storage devices (DASD) in which information is maintained as a log structured array (LSA). The storage space of N DASDs is available for storage of data. The storage space of the M DASDs is available for the check data. M could be equal to zero in which case there would not be any check data. If M=1 the system would be a RAID 5 system in which an exclusive-OR parity is rotated through all the DASDs. If M=2 the system would be a known RAID 6 arrangement.

In FIG. 1, an array 106 comprising four DASDs 106*a*, 106*b*, 106*c*, and 106*d* is shown for illustration, but it should be understood that the DASD array might include a greater or lesser number of DASD. A controller 108 controls the storage of information so that the DASD array 106 is maintained as an LSA. Thus, the DASD recording area is divided into multiple segment-column areas and all like segment-columns from all the DASDs comprise one segment's worth of data. The controller 108 manages the transfer of data to and from the DASD array 106. Periodically, the controller 108 considers segments for free space collection and selects target segments according to some form of algorithm, e.g. the greedy algorithm, the cost-benefit algorithm or the age-threshold algorithm all as known from the prior art, or any other form of free space collection algorithm.

The processor 102 includes (not illustrated): one or more central processor units, such as a microprocessor, to execute programming instructions; random access memory (RAM) to contain application program instructions, system program instructions, and data; and an input/output controller to respond to read and write requests from executing applications. The processor 102 may be coupled to local DASDs (not illustrated) in addition to being coupled to the LSA 104. Typically, an application program executing in the processor 102 may generate a request to read or write data, which causes the operating system of the processor to issue a read or write request, respectively, to the LSA controller 108.

When the processor 102 issues a read or write request, the request is sent from the processor 102 to the controller 108 over a data bus 110. In response, the controller 108 produces control signals and provides them to an LSA directory 116 and thereby determines where in the LSA the data is located, either in a cache 118 or in the DASDs 106. The LSA controller 108 includes one or more microprocessors 112 with sufficient RAM to store programming instructions for interpreting read and write requests and for managing the LSA 104.

The controller 108 includes microcode that emulates one or more logical devices so that the physical nature of the external storage system (the DASD array 106) is transparent to the processor 102. Thus, read and write requests sent from the processor 102 to the storage system 104 are interpreted and carried out in a manner that is otherwise not apparent to the processor 102.

The data is written by the host computer 102 in tracks, sometimes also referred to as blocks of data. Tracks are divided into sectors which can hold a certain number of bits. A sector is the smallest area on a DASD which can be accessed by a computer. As the controller 108 maintains the stored data as an LSA, over time the location of a logical track in the DASD array 106 can change. The LSA directory 116 has an entry for each logical track, to indicate the current DASD location of each logical track. Each LSA directory entry for a logical track includes the logical track number and the physical location of the track, for example the segment the track is in and the position of the track within the segment, and the length of the logical track in sectors. At any time, a track is live, or current, in at most one segment. A track must fit within one segment.

The LSA 104 contains meta-data, data which provides information about other data which is managed within the LSA. The meta-data maps a virtual storage space onto the physical storage resources in the form of the DASDs 106 in the LSA 104. The term meta-data refers to data which describes or relates to other data. For example: data held in the LSA directory regarding the addresses of logical tracks in the physical storage space; data regarding the fullness of segments with valid (live) tracks; a list of free or empty segments; data for use in free space collection algorithms; etc.

The meta-data contained in the LSA directory 116 includes the address for each logical track. Meta-data is also held in operational memory 122 in the LSA controller 108. This meta-data is in the form of an open segment list, a closed segment list, a free segment list and segment status listings.

When the controller 108 receives a read request for data in a logical track, it is sent to the cache 118. If the logical track is not in the cache 118, then the read request is sent to the LSA directory 116 to determine the location of the logical track in the DASDs. The controller 108 then reads the relevant sectors from the corresponding DASD unit of the N+M units in the array 106.

New write data and rewrite data are transferred from the processor 102 to the controller 108 of the LSA 104. The new write and rewrite data are sent to the cache 118. Details of the new write data and the rewrite data are sent to the LSA directory 116. If the data is rewrite data, the LSA directory will already have an entry for the data, this entry will be replaced by an entry for the new data. The data, which is being rewritten, is now dead and the space taken by this data can be reused once it has been collected by the free space collection process.

The new write data and the rewrite data leave the cache 118 via a memory write buffer 120. When the memory write buffer 120 contains a segment's worth of data, the data is written into contiguous locations of the DASD array 106.

As data writing proceeds to the DASD in this manner, the DASD storage in the LSA becomes fragmented. That is, after several sequences of destaging operations, there can be many DASD segments that are only partially filled with live tracks and otherwise include dead tracks.

The writing process described above will eventually deplete the empty segments in the DASD array 106. Therefore, a free space collection process is performed to create empty segments.

A conventional read and write-back cache consists of a cache directory or controller and an amount of cached data in memory. The cache controller may be integral with the cache as a combination of software and/or hardware which is logically equivalent to a separate controller for the cache. When a write comes in, the data is stored and the directory updated. When a read comes in, the directory is examined and if the data is in the cache then it is read from the cache otherwise it is read from the underlying storage component. There is a process which destages data from the cache to the underlying component in order to reclaim space for incoming writes.

Figure 2:
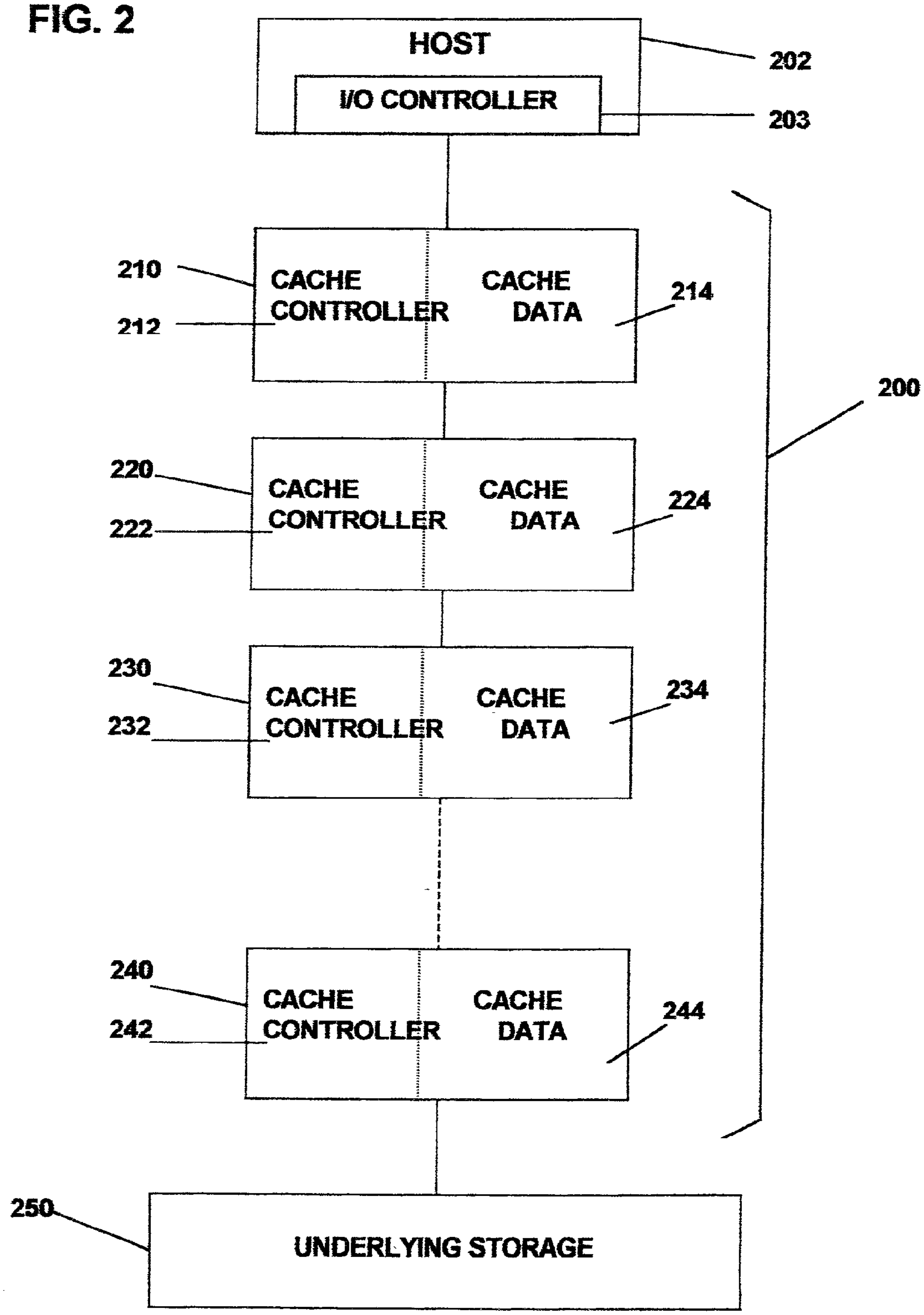
FIG. 2 is a diagrammatic representation of a multi-level cache in accordance with the present invention.

In the present invention, the cache 118 consists of a stack of conventional caches to provide a multi-level write-back cache. FIG. 2 shows a stack 200 which consists of a top cache 210 which has an upstream connection to an input/output controller 203 of the host processor 202. The top cache 210 has a cache controller 212 and a cache data memory 214.

A second cache 220 is disposed in the stack 200 on a level below the top cache 210 and also has a cache controller 222 and a cache data memory 224. A third cache 230 is disposed in the stack 200 on a level below the second cache 220 and also has a cache controller 232 and a cache data memory 234. The number of cache levels in the stack 200 varies during the operation of the multi-level cache starting with a single cache which operates as a conventional cache. Mappings are tied between the adjacent cache levels.

A bottom cache 240 in the stack 200 also has a cache controller 242 and a cache data memory 244 and is the lowest level of the stack 200. The bottom cache 240 communicates with the underlying storage component 250. In the case of the LSA embodiment the bottom cache 240 communicates with the array of DASDs 106 via a write buffer memory 120.

The address mappings are translation functions in the forms of pointer driven redirections of the input/output commands between each level or layer of the cache.

Initially, there is one level of cache in the stack 200 and it behaves as a conventional read and write-back cache for reads and writes. When a point in time copy request is received, the request is processed by recording the mapping defined by the point in time copy operation. The record is tied to the current single level of cache. A new level of cache is created and put on the top of the stack, so that the previous single level of cache becomes the second level of cache. New write requests are then written to the new top level of cache.

Figure 3:
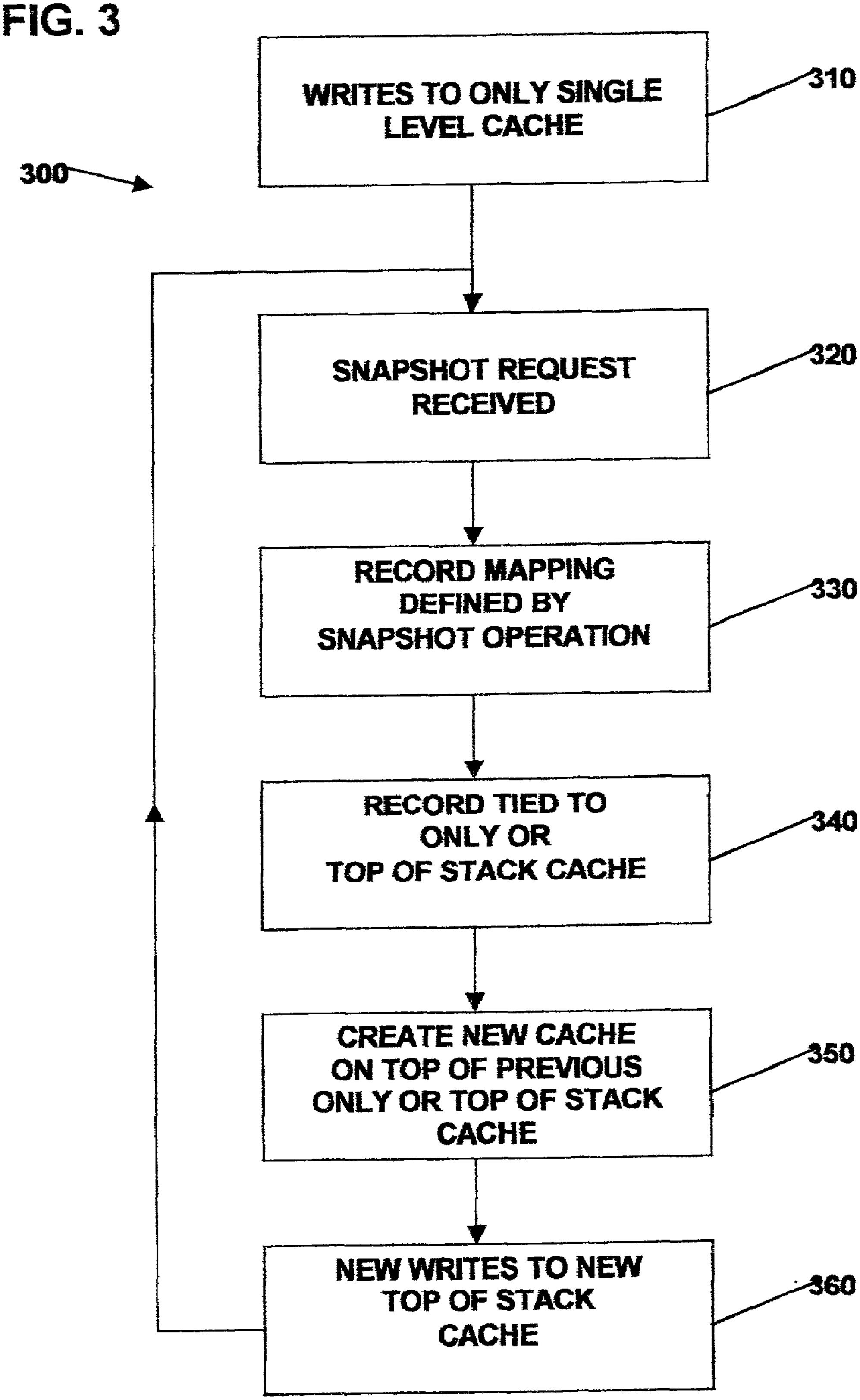
FIG. 3 is a flow diagram of the write process to a multi-level cache in accordance with the present invention.

FIG. 3 is a flow diagram 300 of the process of cache writes and cache level creation. Writes 310 are written to a top level cache. If there is currently only one level of cache, this single level is the top level. Writing to the cache continues until a point in time copy request is received 320. A record is made of the mapping defined by the point in time copy process 330. The record is tied to the top level cache 340. A new level cache is created on top of the previous top level cache and the new cache becomes the top level cache 350. The previous top level cache then becomes the second level cache. New writes are written to the new top level cache 360. When a further point in time copy request is received the process is repeated and multiple levels of a cache are built up.

The process for destaging data from the stack 200 of caches is to destage data from the cache level 240 at the bottom of the stack 200 until it is empty. The point in time copy operation tied to that cache level 240 is then performed on the underlying storage component 250 and the empty cache level 240 is removed from the bottom of the stack 200.

Figure 4:
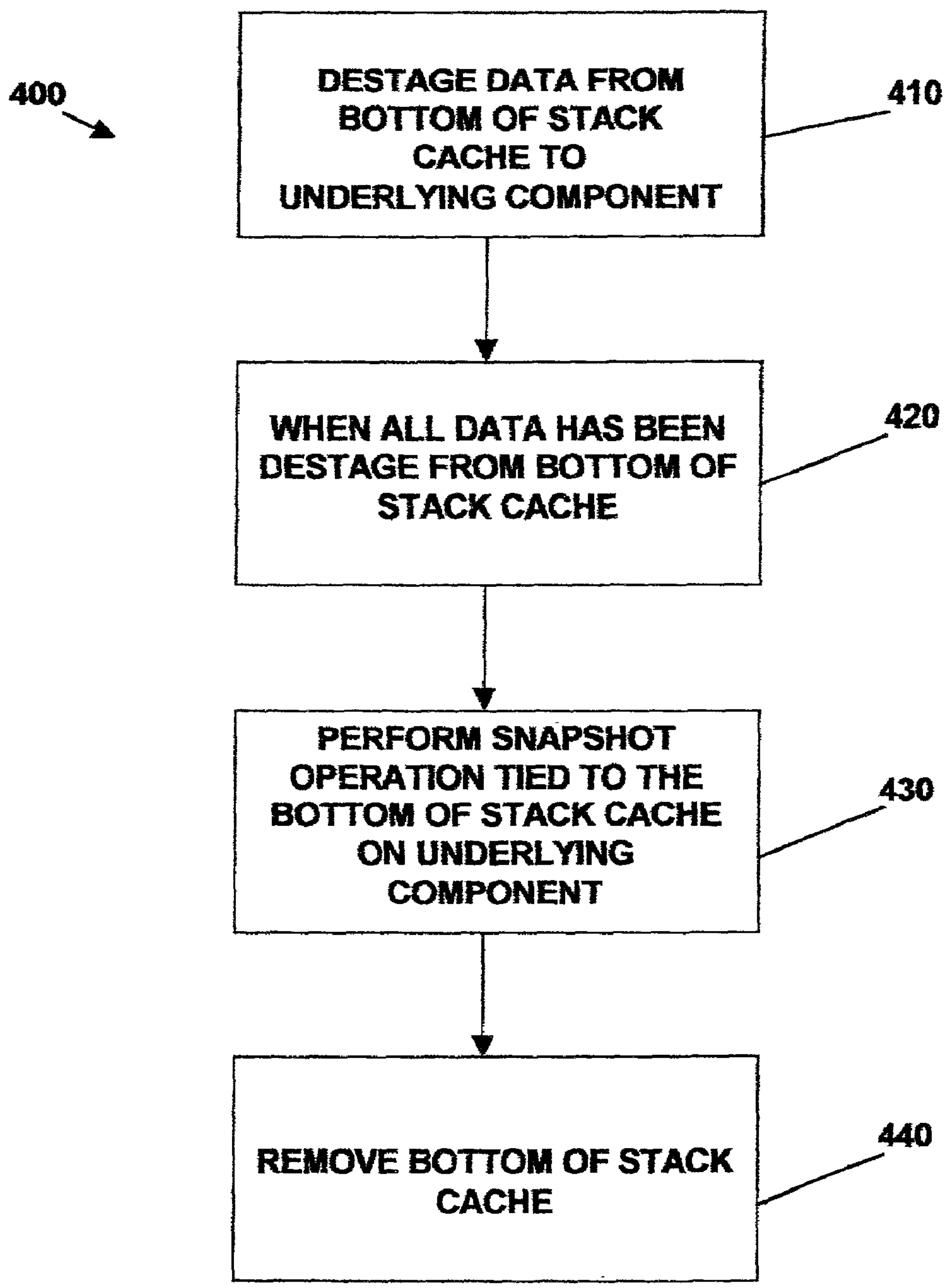
FIG. 4 is a flow diagram of the destage process from a multi-level cache in accordance with the present invention.

FIG. 4 is a flow diagram 400 of the process of destaging data from the multi-level cache. Destaging from the multi-level cache needs to be carried out in order to make room for new writes to the cache. Data is destaged 410 from the bottom cache level in the stack to the underlying storage component. In the embodiment of the LSA 104, the data is destaged to the array of DASDs 106 via a write buffer memory 120 where the data is compiled into a segment's worth of data.

The bottom cache level is then empty of data 420. The point in time copy operation tied to the bottom cache level is carried out 430 on the underlying storage component. The bottom cache level is then removed 440 from the bottom of the stack. The cache level that was previously the level above the bottom cache level then becomes the new bottom cache level and the data from this cache level will be destaged next.

Reads are performed from the multi-level cache by examining a cache directory in the cache controller 212 of the top cache level 210. If the data is in the top cache level 210 then it is read from there. If not, then the mapping tied to the second cache level 220 in the stack 200 is applied to the read request and the read request is looked up in the second cache level directory 222. If the data is found in the cache directory of the cache controller 222 of the second cache level 220, it is read from there. If not the process is repeated down the stack until either the data is found or the bottom of the stack is reached. In the latter case, the data is read from the underlying storage component 250 using the read request as remapped by all of the mappings tied to the stack of caches 200.

Figure 5:
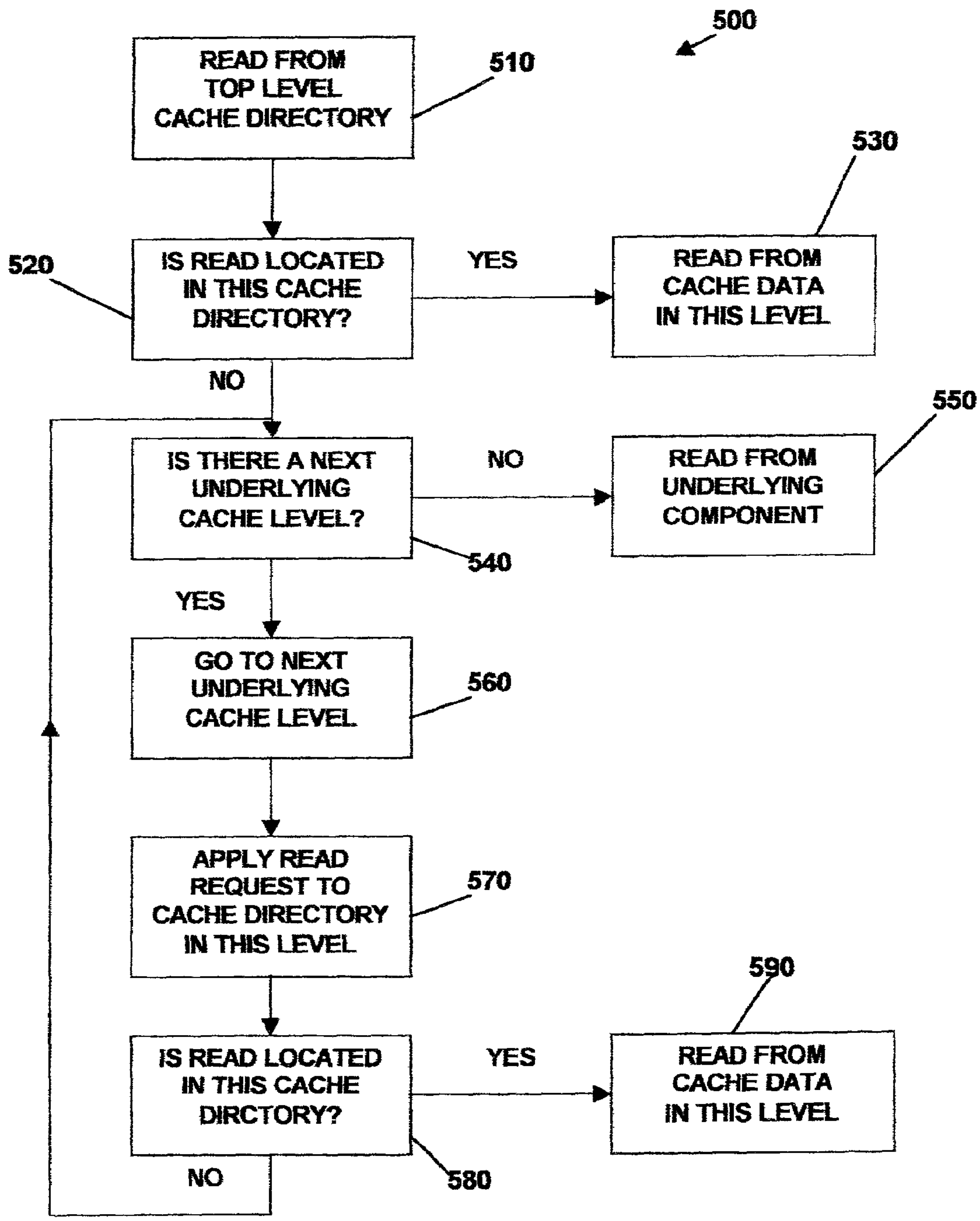
FIG. 5 is a flow diagram of the read process from a multi-level cache in accordance with the present invention.

FIG. 5 is a flow diagram of the read process 500 to the multi-level cache. A read request to the multi-level cache is carried out on the top cache level by looking up the read in the cache directory in the cache controller of the top cache 510. It is then determined if the read has been found 520. If the read has been found, then it is read from the location in the top cache level 530.

If the read is not found in the top cache level, then it is determined if the top cache level is the only level of the stack or if there is a next cache level 540. If there is no next cache level and the top cache is the only level, then the read request is mapped to the underlying storage component 550.

If the top cache level is not the only level, then the read request is mapped to the second cache level by the mapping tied to the second cache level 560. The read request is applied to the directory in the second cache level 570. It is then determined if the read has been found 580. If the read is located in the second cache level, it is read from there 590.

If the read is not found in the second cache level, then the process is repeated from the determination whether or not there is a next cache level in the stack 540. The process ends when the read request is successfully performed from the cache or, if the read request has not been successful in the cache and there is no next cache level, the read request is mapped to the underlying storage component 550.

In this way a write-back cache which consists of a variable number of levels is provided. An address mapping is recorded and applied between each level in the write cache. The recorded address mapping corresponds to a point in time copy operation which has been committed to the write-back cache in electronic time; i.e. it is a fast-snapshot operation. Lower levels of the write cache are destaged before upper levels and, after a level is destaged, the fast-snapshot operation which separates that level from the one above can be performed on the array meta-data.

It would be possible to collect together a number of point in time copy operations and tie them to a single level of the cache provided they do not conflict with intervening writes. This enhancement would reduce the number of levels in the cache and hence improve the speed of read-lookups by reducing the number of cache directories which would have to be searched.

Improvements and modifications can be made to the foregoing without departing from the scope of the present invention.

What is claimed is:

1. A data storage system including a cache comprising a variable number of levels, each level having a cache controller and a cache memory wherein means are provided for address mapping to be recorded and applied between each level of the cache.

2. A data storage system as claimed in claim 1, wherein the means for address mapping are provided for a level between that level and the level above in the cache.

3. A data storage system as claimed in claim 1, wherein the cache includes means for creating a new level in the cache above an existing level and means are also provided for tying an address mapping to the existing level.

4. A data storage system as claimed in claim 1, wherein the address mapping between the levels of the cache corresponds to a point in time virtual copy operation which has been committed to the cache in electronic time.

5. A data storage system as claimed in claim 4, wherein a new level is created in the cache when a point in time virtual copy operation is committed to the cache.

6. A data storage system as claimed in claim 4, wherein a plurality of point in time virtual copy operations are tied to a single level provided the point in time virtual copy operations do not conflict with any intervening writes to the cache.

7. A data storage system as claimed in claim 1, wherein the cache includes means for deleting a level of the cache including means for destaging data from the level to underlying storage devices.

8. A data storage system as claimed in claim 1, wherein lower levels of the cache are destaged before upper levels and after a level is destaged, the address mapping recorded for a destaged level is applied to underlying storage devices.

9. A data storage system as claimed in claim 1, wherein the data storage system also includes a processor and memory, and underlying data storage devices in the form of an array of storage devices having a plurality of data blocks organized on the storage devices in segments distributed across the storage devices, wherein when a data block in a segment stored on the storage devices in a first location is updated, the updated data block is assigned to a different segment, written to a new storage location and designated as a current data block, and the data block in the first location is designated as an old data block, and having a main directory, stored in memory, containing the locations on the storage devices of the current data blocks.

10. A data storage system as claimed in claim 4, wherein the data storage system is in the form of a log structured array and the point in time virtual copy operation is a snapshot copy operation.

11. A data storage system as claimed in claim 4, wherein the point in time virtual copy operation is a flash copy operation.

12. A cache comprising high-speed memory, the cache having a variable number of levels, each level having a cache controller and a cache memory, wherein means are provided for address mapping to be recorded and applied between each level.

13. A cache as claimed in claim 12, wherein the means for address mapping are provided for a level between that level and the level above in the cache.

14. A cache as claimed in claim 12, wherein the cache includes means for creating a new level in the cache above an existing level and means are also provided for tying an address mapping to the existing level.

15. A cache as claimed in claim 12, wherein the address mapping corresponds to a point in time virtual copy operation which has been committed to the cache in electronic time.

16. A cache as claimed in claim 15, wherein a new level is created when a point in time virtual copy operation is committed to the cache.

17. A cache as claimed in claim 15, wherein a plurality of point in time virtual copy operations are tied to a single level provided the point in time virtual copy operations do not conflict with any intervening writes.

18. A cache as claimed in claim 12, wherein the cache includes means for deleting a level of the cache including means for destaging data from the level to an underlying storage system.

19. A cache as claimed in claim 12, wherein lower levels of the cache are destaged before upper levels and after a level is destaged, the address mapping recorded for that level is applied to an underlying storage system.

20. A cache as claimed in claim 15, wherein the point in time virtual copy operation is a snapshot copy operation.

21. A cache as claimed in claim 15, wherein the point in time virtual copy operation is a flash copy operation.

22. A method of data storage comprising reading and writing data to a cache having a variable number of levels, wherein the method includes recording and applying address mapping between each level of the cache.

23. A method of data storage as claimed in claim 22, wherein the address mapping is provided for a level between that level and the level above in the cache.

24. A method of data storage as claimed in claim 22, wherein the method includes creating a new level in the cache above an existing level and tying an address mapping to the existing level.

25. A method of data storage as claimed in claim 22, wherein the address mapping between the levels of the cache corresponds to a point in time virtual copy operation which has been committed to the cache in electronic time.

26. A method of data storage as claimed in claim 25, wherein the method includes creating a new level in the cache when a point in time virtual copy operation is committed to the cache.

27. A method of data storage as claimed in claim 22, including the steps of: writing data to a first level of the cache until a point in time virtual copy operation is committed to the cache; recording the mapping defined by the point in time virtual copy operation; tying the record to the first level; creating a second level of the cache; writing subsequent writes to the second level of the cache.

28. A method of data storage as claimed in claim 26, wherein a plurality of point in time virtual copy operations are tied to a single level provided the point in time virtual copy operations do not conflict with any intervening writes to the cache.

29. A method of data storage as claimed in claim 25, wherein the point in time virtual copy operation is a snapshot copy operation.

30. A method of data storage as claimed in claim 25, wherein the point in time virtual copy operation is a flash copy operation.

31. A method of data storage as claimed in claim 22, including the steps of: receiving a read request in the cache; searching a first level of the cache for the read; applying the address mapping for the next level to the read request; searching the next level of the cache; continuing the search through subsequent levels of the cache; and terminating the search when the read is found.

32. A method of data storage as claimed in claim 31, including the step of remapping a read request by applying all the address mappings of the levels of the cache to the read request and applying the remapped read request to an underlying storage system.

33. A method of data storage as claimed in claim 22, wherein the method includes deleting a level of the cache including destaging data from the level to underlying storage devices.

34. A method of data storage as claimed in claim 22, including the steps of: destaging data from the lowest level of the cache to an underlying storage system; applying the address mapping for the lowest level to the underlying storage system; deleting the lowest level of the cache.

35. A method of data storage as claimed in claim 22, wherein the data storage is arranged as a log structured array storage subsystem including a write-back cache.

36. A computer program product stored on a computer readable storage medium, comprising computer readable program code means for performing the steps of reading and writing data to a cache having a variable number of levels, recording and applying an address mapping between each level of the cache.

* * * * *